United States Patent [19]

Schloeman

[11] 3,908,934
[45] Sept. 30, 1975

[54] PROGRAMMED GAIN CONTROL FOR AIRCRAFT THROTTLE CONTROL SYSTEM

[75] Inventor: Robert W. Schloeman, Phoenix, Ariz.

[73] Assignee: Sperry Rand Corporation, New York, N.Y.

[22] Filed: Dec. 3, 1973

[21] Appl. No.: 421,003

[52] U.S. Cl. ............................. 244/77 D; 235/150.2
[51] Int. Cl.² .......................................... B64C 13/18
[58] Field of Search ............... 60/224, 243, 39.28 R; 73/178 R, 178 T; 235/150.2, 150.21; 244/77 D; 318/619; 328/1

[56] References Cited
UNITED STATES PATENTS

| 3,237,107 | 2/1966 | Bresenoff et al. ............... 244/77 D X |
| 3,591,110 | 7/1971 | Dramer et al. ..................... 244/77 D |
| 3,624,364 | 11/1971 | Dommasch ...................... 235/150.2 |
| 3,627,236 | 12/1971 | Hess .................................. 244/77 D |
| 3,661,347 | 5/1972 | Woodworth et al. ............. 244/77 D |

Primary Examiner—Trygve M. Blix
Assistant Examiner—Stephen G. Kunin
Attorney, Agent, or Firm—Howard P. Terry

[57] ABSTRACT

The aircraft control system provides for the generation of an aircraft command speed signal and its combination with a calibrated craft velocity signal for generation of an air speed error for operating an air speed throttle control servo. A multiplier gain control element preceding the throttle servo alters the gain of the air speed error signal in a predetermined programmed manner in terms of calibrated air speed, altitude rate, and air speed error, thus providing reliable and safe control over the several modes of operation of the aircraft, including the climb, take off, cruise, let down, approach, and landing modes.

10 Claims, 7 Drawing Figures

PROGRAMMED GAIN CONTROL FOR AIRCRAFT THROTTLE CONTROL SYSTEM

CROSS REFERENCE TO RELATED PATENTS

The apparatus of the present invention is an improvement over the aircraft control system of the H. Miller U.S. Pat. No. 3,691,356 for a "Speed Command and Throttle Control System for Aircraft," issued Sept. 12, 1972 and assigned to the Sperry Rand Corporation.

BACKGROUND OF THE INVENTION

1. Field of the Invention

The present invention pertains to improved aircraft throttle control apparatus for the optimum operation of an aircraft in its several modes of flight and more particularly concerns a gain controller for achieving optimum engine throttle control in the operation of aircraft from take off to landing.

2. Description of the Prior Art

In the aforementioned Miller U.S. Pat. No. 3,691,356, there is disclosed an aircraft speed command and automatic throttle control system which operates to supply guidance to the human pilot through a flight director or through automatic control of the aircraft engine throttles during the aircraft's entire flight profile from take off to touch down, maintaining acceptable speed margins for all aircraft configurations and operating conditions. In practice, the apparatus of the Miller patent, with its fixed gain for the several operating modes of the aircraft, is found under some circumstances to provide more throttle activity than is actually required by standard safety considerations and desired from an operational standpoint. Such excessive throttle activity, for instance, in the high speed cruise mode, is of practical concern, since it effects the smoothness of flight, is annoying to pilots and passengers, increases fuel consumption, and tends to stress equipment unduly and unnecessarily.

SUMMARY OF THE INVENTION

The invention is a throttle control apparatus devoid of the prior art problems and which is also useful in automatic flight during the several modes of aircraft operation, including take off, climb-to-cruise, cruise, let down, approach, and landing modes, the throttles being controlled by a system generally similar to that of the aforementioned Miller patent. The system of the Miller patent employs a substantially fixed gain for signals injected into the throttle control servo mechanism for all flight modes, whereas according to the present invention, throttle control signals are derived by processing craft maximum and minimum permissible speeds and calibrated air speed signals that are subjected to the action of the novel programmed gain multiplier before actually passing to the throttle servo system. In the variable gain device, control is exercised by a specially programmed combination of signals including signals representing air speed error, calibrated air speed, and altitude rate.

DESCRIPTION OF THE PREFERRED EMBODIMENTS

In the present invention, as in the invention of the H. Miller U.S. Pat. No. 3,691,356 for a "Speed Command and Throttle Control System for Aircraft," issued Sept. 12, 1972 to the Sperry Rand Corporation, the aircraft climb-to-cruise, cruise, let down, approach, and landing modes require that aircraft automatic throttles be controlled to maintain the optimum thrust condition of the engines or the desired air speed, which speed should never be less than a computed safe margin above the stall speed for the aircraft. The system of the present invention provides these functions by means of an automatic throttle control generally similar to that shown in FIG. 15 of the Miller patent. The apparatus computes minimum speeds as a function of flap position and of gross weight of the aircraft. It also computes maximum speeds based on the required structural protection for the extended flap mode. These data also are used in the present invention to over-ride any human pilot-selected air speed which is outside the range of values between the safe maximum value and the safe minimum value.

The automatic throttle control mode of the present invention may also utilize a comparison of engine fan speed or pressure ratio with an optimum value to control throttle position during the climb-to-cruise and the go-around modes. If so, the error signal is supplied from a thrust rating computer which determines the limiting thrust condition of the engine and expresses it as a maximum fan speed or engine pressure ratio. The throttle control system may use this data not only as a direct throttle control reference independent of air speed, but also as a throttle position limiter when the system is under air speed reference control.

It will be seen that the novel apparatus of the present invention is useful in automatic flight during several modes of operation, including take off, climb-to-cruise, cruise, let down, approach, and landing modes, the throttles being controlled, for example, by a system generally similar to that of the Miller patent. However, the system of the Miller patent employs a substantially fixed gain for signals injected into the throttle control servo mechanism for all flight modes and it is found that such a uniform or fixed system gain has certain disadvantages, including excessive throttle activity in the high speed cruise mode. According to the present invention, the gain of the system is controlled so as to be substantially optimum for each flight mode. For this purpose, the system gain is reduced at high cruise speeds, while at lower flying speeds, the gain is increased according to a predetermined program. In particular, the predetermined gain program is governed by three variables; these are calibrated air speed, air speed error, and altitude rate. The latter term is the over-riding term required for maneuvering flight. Accordingly, the present invention provides reliable and desirable control over all modes of flight, providing a generally suitable servo loop gain program for the throttle control system, the gain in use being optimum for each selected flight mode.

Figure 1:
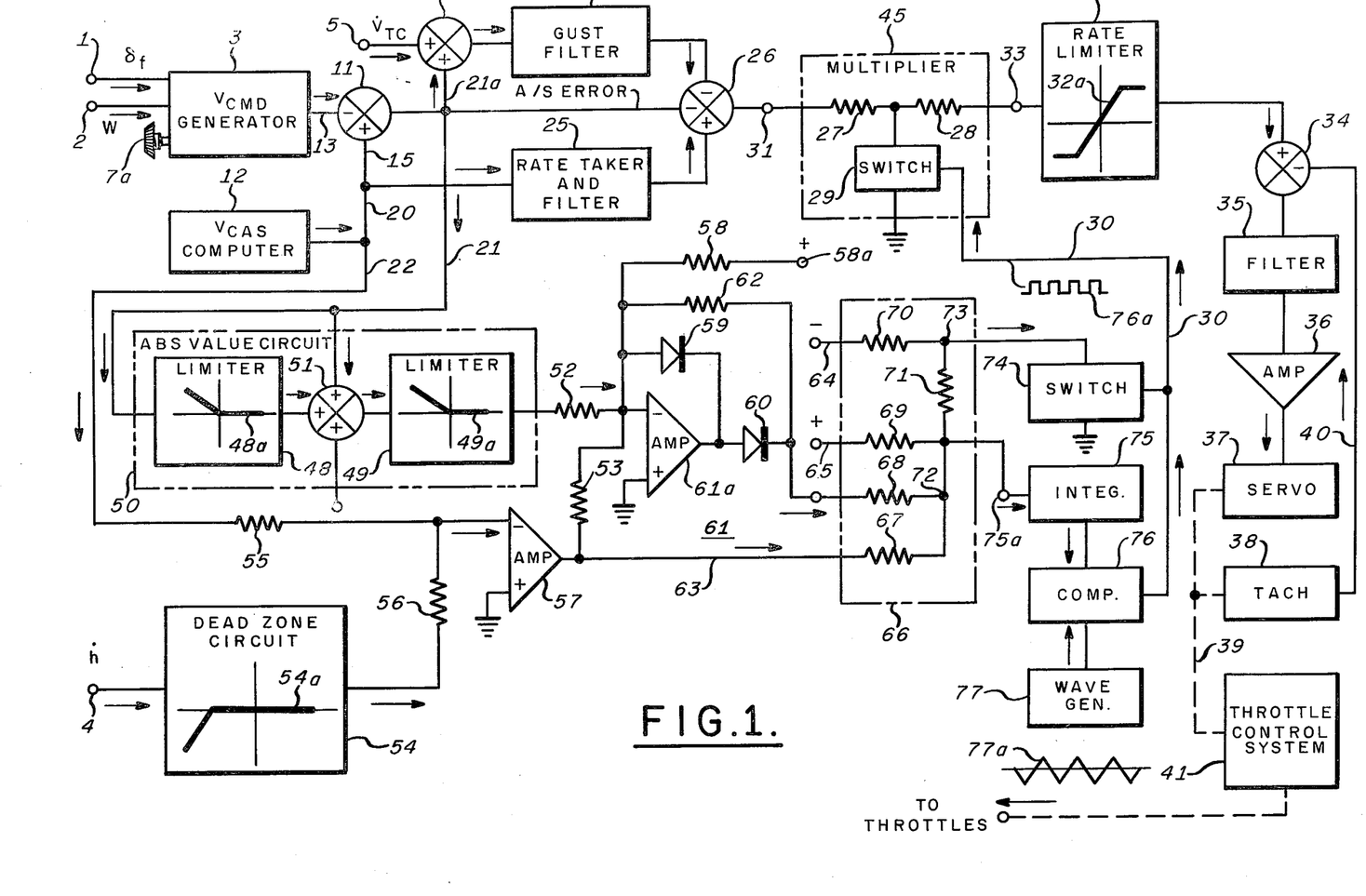
FIG. 1 is a wiring diagram of the invention illustrating its components and electrical and mechanical connections.

Referring particularly to FIG. 1, the amplitudes of the principal input electrical signals used in the invention are proportional to:

$\delta_f$ = flap position,
$W$ = aircraft weight,
$V_{CAS}$ = calibrated craft air speed,
$\dot{h}$ = vertical speed of the craft,
$\dot{V}_{TC}$ = aircraft acceleration along the flight path, and
$V_{SET}$ = a pilot selectable value of craft speed.

Electrical quantities proportional to flap position $\delta_f$ and to aircraft weight $W$ are respective inputs on leads 1 and 2 of the $V_{CMD}$ generator 3 of FIG. 1, a device adapted to calculate a voltage quantity proportional to the desired or command speed $V_{CMD}$ at its output lead 13. The quantity $\delta_f$, whose amplitude is proportional to flap position, is received from a conventional flap position transducer (not shown). The quantity $W$ is proportional to craft weight and is generated by apparatus such as shown in FIGS. 9 or 10 of the aforementioned Miller patent.

Figures 2, 3:
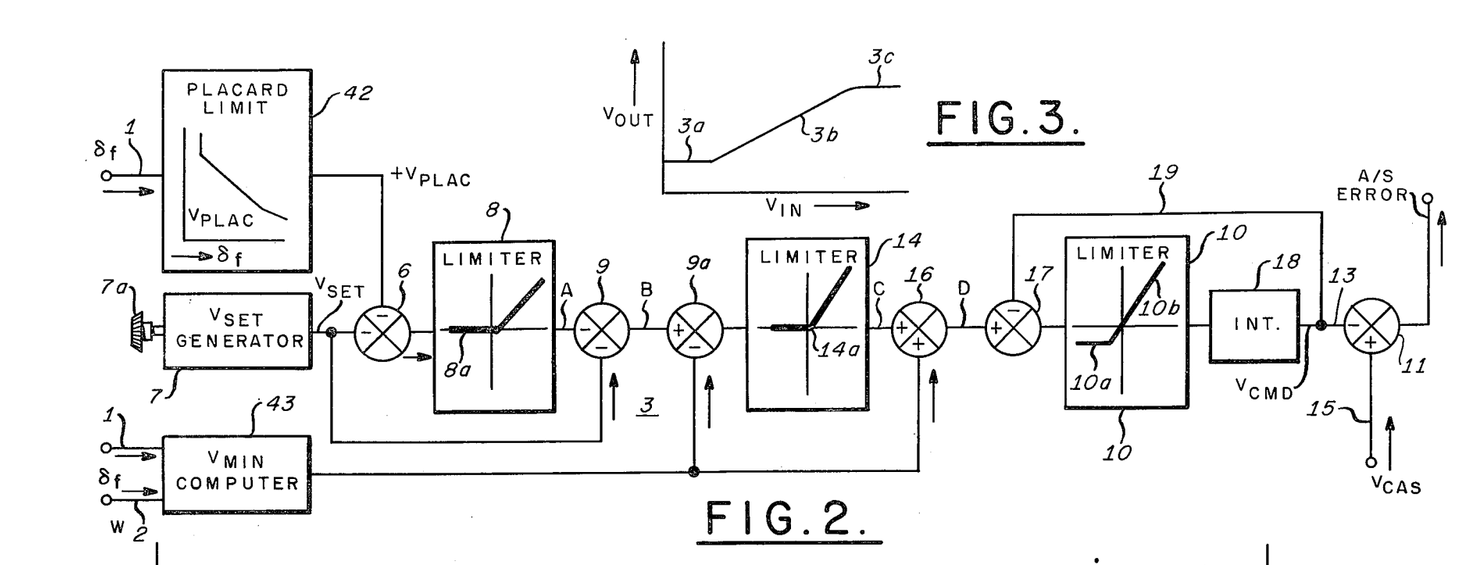
FIG. 2 is a block diagram of the $V_{CMD}$ computer 3 of FIG. 1.
FIG. 3 is a graph useful in explaining the operation of the sub-system of FIG. 2.

Before describing how the signal on lead 13 is employed, it will be convenient to discuss details of the $V_{CMD}$ generator 3 with respect to FIG. 2. In FIG. 2, it is seen that the quantity $\delta_f$ is applied as an input on lead 1 to placard limit 42. Function generator 42 is a device conventionally used in flight control systems because of the special speed limitations imposed by certain aircraft flap configurations. In the conventional function generator or placard limit device 42, signals $\delta_f$ from the flap position pick-off are manipulated to form a new signal $+V_{PLAC}$ proportional to maximum permissible "placard" speeds, which quantity is then supplied as one input of the algebraic summation circuit 6.

A second input to summation circuit 6, polarized as indicated in the drawing, is generated by the $V_{SET}$ generator 7 according to the manual setting of a calibrated adjustment 7a. The $V_{SET}$ generator or controller 7 permits the human pilot to select a desired craft speed $V_{SET}$ so as to obtain a voltage at the output of generator 7 for application as one input to summation circuit 6. Selection of the voltage amplitude is accomplished by manual rotation of the calibrated dial 7a.

As previously noted, voltages representing $\delta_f$ and aircraft weight $W$ are used in the $V_{CMD}$ generator as seen in FIG. 2, being applied as inputs to the $V_{MIN}$ computer 43. Computer 43 is a known device adapted to calculate a voltage quantity proportional to the minimum permissible speed $V_{MIN}$ for the aircraft being controlled, as is further explained in the Miller U.S. Pat. No. 3,691,356.

The output of summation circuit 6 is supplied to a conventional limiter 8 having the asymmetric limiting characteristic shown in the graph 8a. The output of limiter 8, which is proportional to the excess of $V_{SET}$ over $V_{PLAC}$, is connected to one input of a further conventional summation circuit 9, polarized as indicated, to a second input of which is coupled the voltage proportional to $V_{SET}$ from computer 7. The resultant output of summation circuit 9 is proportional to $V_{SET}$ up to a maximum value of $V_{PLAC}$. The output of summation circuit 9 goes to a further conventional algebraic summation circuit 9a, to a second input of which is supplied the signal proportional to $V_{MIN}$ from computer 43, with polarizations as indicated in the drawing. The output of summation device 9a is coupled through a further limiter 14, having an asymmetric limiting characteristic 14a generally similar to characteristic 8a, to one input of a conventional summation circuit 16. Poled as shown in the drawing, summation device 16 also receives an input signal from the $V_{MIN}$ computer 43. The resultant output of summation device 16 is proportional to summation 9 with a minimum value of $V_{MIN}$. Summing device 16 supplies one input to a further conventional summation device 17, one input of which receives a fed back signal on lead 19. Summation device 17 poled as indicated in the drawing, supplies an algebraic summation output to a conventional limiter 10 having the limiter characteristic shown in graph 10a, 10b. The limited output of limiter 10 is applied through a conventional integrator 18 via lead 13 to the conventional summation device 11, poled as shown in the drawing. The output of integrator 18 on lead 13 is the desired command velocity voltage $V_{CMD}$ and it is fed back via lead 19 to summing device 17. A voltage proportional to calibrated air speed $V_{CAS}$ is also fed, via lead 15, to summing device 11, so that the output of the latter is air speed error. As seen in FIG. 1, the voltage directly proportional to $V_{CAS}$ is generated in a now standard air data computer or $V_{CAS}$ computer 12.

Referring again to FIG. 2, the elements to the left of summation device 16 perform in effect as a complex composite limiter arrangement and are adapted to follow certain rules under the following conditions 1, 2, and 3:

Condition 1: $V_{SET} \geq V_{PLAC}$
Condition 2: $V_{MIN} \geq V_{SET} < V_{PLAC}$
Condition 3: $V_{MIN} \geq V_{SET}$ In any condition, $V_{MIN}$ is never equal to or greater than $V_{PLAC}$. Then, for the signal locations A, B, C, and D of FIG. 2, the following rules hold:

Location A
  Condition 1: $V_A = +V_{SET} - V_{PLAC}$
  Conditions 2,3: $V_A = 0$
Location B
  Condition 1: $V_B = +V_{PLAC}$
  Condition 2,3: $V_B = +V_{SET}$
Location C
  Condition 1: $V_C = +V_{PLAC} - V_{MIN}$
  Condition 2: $V_C = +V_{SET} - V_{MIN}$
  Condition 3: $V_C = 0$
Location D
  Condition 1: $V_D = +V_{PLAC} - V_{MIN} + V_{MIN} = +V_{PLAC}$
  Condition 2: $V_D = +V_{SET} - V_{MIN} + V_{MIN} = +V_{SET}$
  Condition 3: $V_D = 0 + V_{MIN} = +V_{MIN}$ Accordingly, it will be seen that the aforementioned composite limiter has the limiter characteristic 3a, 3b, 3c of FIG. 3. The horizontal segment 3a (condition 3) of the characteristic is determined by the value of $V_{MIN}$, the major segment 3b (condition 2) is directly proportional to the voltage $V_{SET}$, and the second horizontal segment 3c (condition 1) shows the constraint of the flap safety speed control exercized by placard limit 42.

The conventional limiter circuit 10 functions to limit the rate of change signal $V_{CMD}$; it is included in an integrator-follow up loop in such a conventional way as to constrain the input level to the integrator only when there is a decrease speed command. Increase speed commands are limited only by the slew rate of the integrator-follow up loop. The rate limit 10a is inhibited for all conditions when the throttle system is not responsive to $V_{CMD}$; i.e., minimum thrust limits for speed control, system disengaged, etcetera.

The summation output of summing circuit 11, whose inputs are polarized as shown in FIG. 1, is air speed error and is coupled directly in FIG. 1 as one input of a further conventional summing circuit 26 and has additional applications. As will be described, it is supplied via lead 21 to the absolute value circuit 50 which forms an essential part of the present invention. It is also coupled via an extension 21a of lead 21 to one input of summing circuit 23; a second input of summing circuit 23 is supplied with a signal of amplitude proportional to $\dot{V}_{TC}$ or aircraft acceleration along the craft flight path. The value $\dot{V}_{TC}$ may be generated by any of several conventional methods, including its generation by a speed parameter computer such as described in connection with FIGS. 2 and 11 of the Miller U.S. Pat. No. 3,691,356. The value $\dot{V}_{TC}$ serves as a low frequency damping term.

The output of summing circuit 23 is supplied through gust filter 24 as a further input to summing circuit 26, poled as shown in FIG. 1. A gust filter circuit similar to circuit 158 of the Miller patent may be employed. Gust filter 24 is basically a conventional high pass filter in which an integrator is conventionally connected in a feed back path of a high gain amplifier, the latter also receiving the modification of the air speed error signal. The gust filter 24 serves particularly to improve the performance of the throttle control system under the effects of wind gusts and wind shears having appreciable components along the flight path. The voltage proportional to $V_{CAS}$ on lead 20 is coupled through a conventional rate taker-filter 25 to a third input of the conventional summing circuit 26. Rate taker-filter 25 is a conventional circuit for generating the rate of the signal on lead 20 so that its output is a band width limited rate voltage. Accordingly, the amplitudes of the outputs of gust filter 24 and of rate taker-filter 25 are algebraically added to the basic air speed error signal as indicated by the polarities shown in the figure with respect to summing circuit 26.

The output of summing circuit 26 is connected through terminals 31 and 33 of a multiplier circuit 45 and coupling resistors 27 and 28 to throttle rate limiter 32. The junction between resistors 27 and 28 of the multiplier circuit 45 is coupled through a conventional shunt switch 29 which is cyclically controlled so that the output of summing circuit 26 is grounded in predetermined alternate time intervals of controllable duration; there is no signal at the input of rate limiter 32 during predetermined alternate intervals of the switching cycle. The shunt switch 29 is conducting to ground when a predetermined voltage is coupled to it via lead 30, as will be further discussed.

Throttle rate limiter 32 is placed at the input of the throttle control servo for operation of the conventional throttle system 41 and has the conventional generally symmetric characteristic illustrated by graph 32a. The throttle control servo controlled by the output of throttle rate limiter 32 may include an input filter 35 and a conventional power servo amplifier 36 for control of the throttle actuator or actuators of throttle system 41 through a suitable mechanical linkage 39. Linkage 39 may also operate an electrical tachometer or rate generator 38 for adding an error rate signal in summing circuit 34 to the incoming servo control signal. Filter 35 will generally be characterized as a lead-lag filter within a velocity servo loop for providing the necessary filtering of the demodulated output of alternating current tachometer 38 while maintaining loop stability. By way of example, the dual channel throttle control system of the H. Miller U.S. Pat. No. 3,504,248, issued March 31, 1970 for a "Dual Channel Servo System Having Torque Equalization" and assigned to the Sperry Rand Corporation may be used with the present invention, since it has additional desirable failoperational characteristics whereby no single failure can interfere with satisfactory operation of the servo. It will also be understood by those skilled in the art that the described combinations of polarities for the ports of the several summation circuits of FIGS. 1, 2, and 4 may be systematically altered, still achieving the desired control over the nature of the output signals operating throttle control 41.

The part of the invention designed for cyclic control of shunting switch 29 in multiplier 45 will now be described in further detail; this portion of the system makes use of the air speed error signal output on lead 21 from summing circuit 11 and the voltage proportional to $V_{CAS}$ on lead 22 which arises in generator 12. For this purpose, the bipolar air speed error voltage amplitude on lead 21 is supplied to two inputs of the absolute value circuit 50 which is a circuit adapted, in effect, for rectifying both polarities of the bipolar input signal so that a signal of only one predetermined polarity appears at its output for application to the amplifier 61a of circuit 61. Absolute value circuit 50 may include limiters 48 and 49 having the respective limiting characteristics of graphs 48a and 49a as will be explained later in connection with FIG. 4. The output of absolute value circuit 50 is applied through resistor 52 of the summation circuit comprising resistors 52 and 53 to one input of the amplifier 61a of circuit 61, the other input of amplifier 61a being grounded and polarized as indicated. A positive reference voltage is obtained from a source (not shown) connected at terminal 58a and is supplied through resistor 58 to amplifier 61a. Amplifier 61a has an output terminal coupled to its input through a diode 59, poled as represented in FIG. 1. Thus, one of four inputs to the resistor combining control network 66 is generated and coupled to resistor 68.

Other inputs to control network 66 at the respective leads 64 and 65 are positive and negative reference voltages, nominally of +12 and −12 volt magnitude. A fourth input to resistor network 66 is generated in part from the altitude rate signal of amplitude $\dot{h}$, which may be a conventional output of a standard radio or other altitude sensor. The voltage value proportional to $\dot{h}$ on input lead 4 is modified by a standard dead zone circuit 54 having the characteristic 54a and the resultant signal is applied across resistor 56 to be added to the amplitude of the $V_{CAS}$ signal coupled from $V_{CAS}$ computer 12 to one input of an amplifier 57, whose second input is grounded and polarized as indicated. The signal output of amplifier 57 is coupled via lead 63 to the resistor 67 in logic network 66.

In the combining control network 66, a summing or forcing function is performed with the negative reference signal on lead 64 appearing across resistor 70, the positive reference signal on lead 65 appearing across resistor 69, and the output of amplifier 57 being conveyed via lead 63 across resistor 67. The amplified output of amplifier 61 is passed through the biased diode 60 to appear across resistor 68. The output ends of the several resistors 67 through 69 are coupled to an input terminal 75a of integrator 75. For control via lead 30, the cyclic conductivity of shunting switch 74 is coupled to terminal 73. A resistor 71 is coupled at terminals 72 and 73 between the output ends of resistors 69 and 70. The forcing function of network 66 is that the sum of the currents entering the node terminal 72 must be zero.

Referring still to FIG. 1, the analog voltage output on terminal 75a is coupled through a conventional integrator 75, the output of which is supplied to an arrangement consisting of circuit elements 76 and 77 which together convert the unipolar analog output of integrator 75 into a train 76a of variable width pulses. A conventional analog-to-pulse width converter may be employed for this purpose, such as a circuit comprising a comparator 76 for effecting a voltage comparison of the output 77a of the reference triangular wave generator 77. Wave 77a may have a frequency of 3.5 Hz, for example. Depending upon the amplitude of the analog signal output from integrator 75, the pulse width of each pulse in the pulse train 76a varied, the duration of each such positive pulse being directly proportional to the instantaneous magnitude of the integrator 75 output. For completing the integration servo loop, the pulse wave 76a on lead 30 is used to operate switch 74 for periodically coupling the terminal 73 of the logic network 66 to ground in synchronism with the operation of the gain multiplier switch 29. Integrator 75 serves also to smooth transients in the analog signal which it processes, so that the widths of the pulses of the output train 76a of comparator 76 vary in a generally continuous manner. Accordingly, the multiplier 45 and the switch 29 within it are enabled to multiply the gain between terminals or nodes 31 and 33 in proportion to the varying pulse width signal 76a output from comparator 76.

Figures 4, 5:
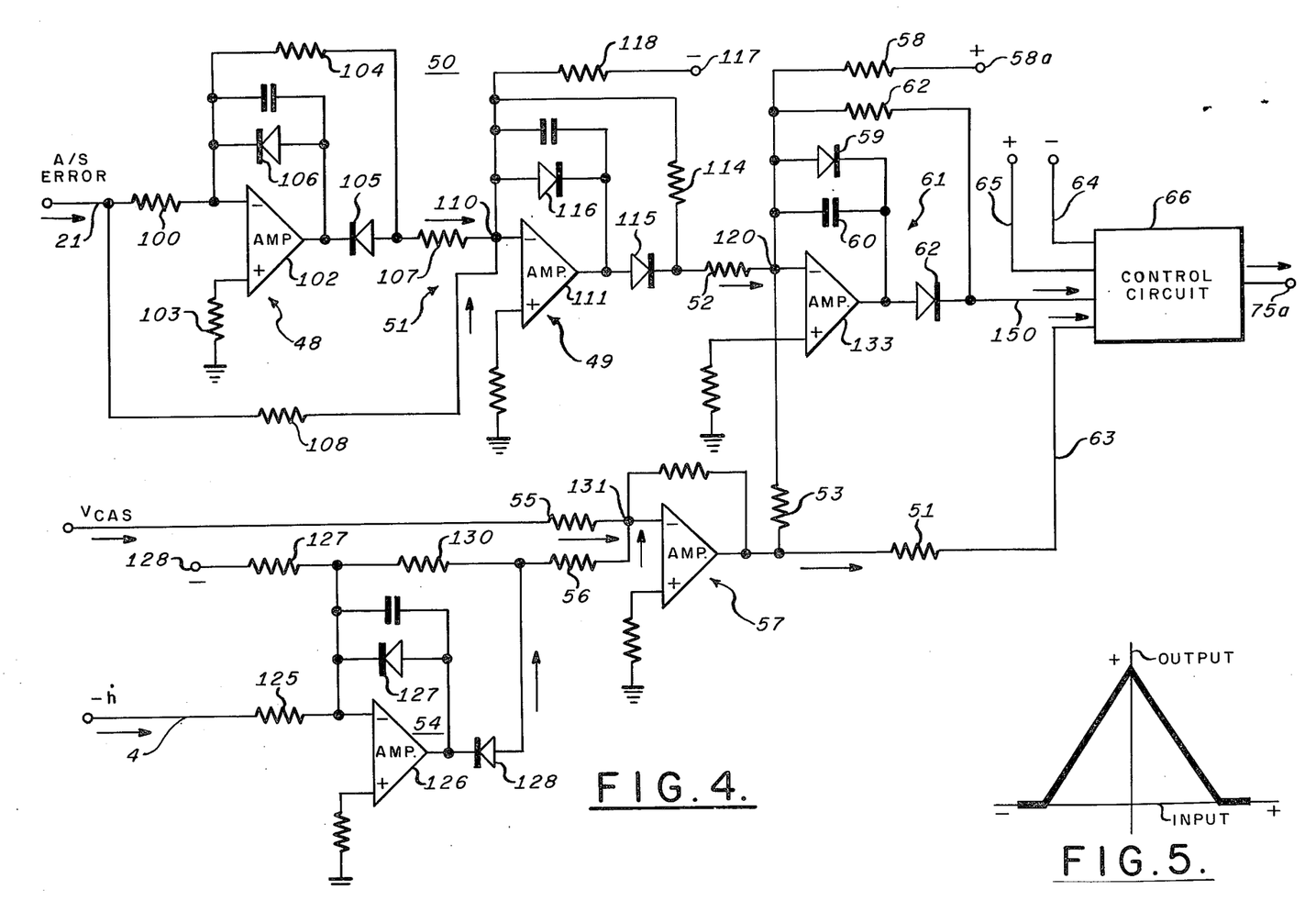
FIG. 4 is a wiring diagram of parts of the system of FIG. 1.
FIG. 5 is a graph useful in explaining FIG. 4.

The circuits 48, 49, 54, 57, and 61 for controlling the cyclic multiplier 45 are shown in more detail in FIG. 4, where it is seen the the bipolar air speed error signal on lead 21 is coupled through an input resistor 100 to an input terminal of a conventional unity-gain polarity-reversing operational amplifier 102 which forms the active element of the limiter circuit 48, the other input terminal of amplifier 102 being connected to ground through resistor 103. The operational amplifier 102 has a diode 105 poled as illustrated in its output lead, a resistor 104 coupling the output end of diode 105 back to the junction between input resistor 100 and amplifier 102, and a second diode 106 coupled to the opposite side of diode 105 and again to the input of operational amplifier 102. Diodes 105, 106 enable the circuit 48 to act as a precision limiter, preventing any negative signal from being supplied through output coupling resistor 107 to terminal 110. Consequently, limiter 48 provides only positive outputs at resistor 107 that are equal in magnitude to the negative signals appearing on lead 21.

The limiter circuit 49 is evidently similar in nature to limiter 48, but its input is the limited unipolar output of circuit 48 plus the attenuated version of the bipolar air speed error signal passing through resistor 108. These signals are coupled through input terminal 110 of the conventional unity-gain polarity-reversing operational amplifier 111 which forms the active element of the limiter circuit 49, the other input terminal of amplifier 111 being connected to ground through a resistor. The operational amplifier 111 has a diode 115 poled as illustrated in its output lead, a resistor 114 coupling the output end of diode 115 back to the input junction 110 of amplifier 111, and a second diode 116 coupled to the opposite side of diode 115 and again to the input 110 of operational amplifier 111. Again, the diodes 115, 116 enable circuit 49 to act as a precision limiter preventing any negative signal from being supplied through output coupling resistor 52 to terminal 120.

The general operation of the cooperating limiters circuits 48 and 49 in the absolute value circuit 50 may be described as follows. In the absence of any air speed error voltage on lead 21, the amplifier 111 causes a low positive unidirectional voltage (nominally 2 volts) to be presented to output resistor 52. This voltage is determined by the negative bias applied at terminal 117 through resistor 118, by the ratio of the resistances of resistors 114 and 118, and by the inverting characteristics of amplifier 111. The resistance of resistor 108 is selected to equal that of resistor 114. Accordingly, the operational amplifier 111 will attempt exactly to follow the level of the air speed error voltage supplied at lead 21, but with polarity reversal. In the particular instance, for example, in which limiter circuit 48 is limiting a positive unidirectional voltage on lead 21 to zero, the net two volt unidirectional output of limiter 51 appearing at terminal 120 will be reduced toward zero in proportion to the voltage on lead 21. This establishes a scale factor for the circuit, such that 10 knots, for example, corresponds to the two volt level. Thus, for an actual air speed error on lead 21 corresponding to +10 knots, the output of limiter 49 at terminal 120 is zero.

The resistance of resistor 107 is about one-half of that of resistor 114, so that the output amplitude from limiter 48 is doubled in amplitude in passing through limiter 49. Because only negative values of the air speed voltage appearing on lead 21 are passed by limiter 48 as a positive signal, the consequence of the operation of the several gains affecting the signal in passing through limiter 48, resistor 107, and resistor 108 is to effect a unity gain for the circuit at terminal 110 with respect to the input air speed signal. The polarity reversal characteristic of operational amplifier 102 causes subtraction from the bias voltage, thus reducing the output at terminal 120 to zero for the positive 10 knot air speed error. The cooperating limiter circuits 48 and 49 together form the absolute value circuit 50 in FIG. 1. As seen in FIG. 5, the cooperating limiter character is symmetric. For no input, a substantial output exists. Regardless of the polarity of the input, the output is positive and is proportionally and symmetrically reduced to zero in the manner as indicated in FIG. 5.

A modifying input signal also coupled to terminal 120 is derived from a circuit which manipulates the voltage $V_{CAS}$ and the voltage $h$ respectively appearing as in FIG. 1 from the $V_{CAS}$ computer 12 and upon lead 4. The voltage proportional to $-\dot{h}$ or altitude rate is supplied through input resistor 125 to one terminal of operational amplifier 126 also supplied with a negative operating voltage through resistor 127 from a voltage source (not shown) coupled to terminal 128. The operational amplifier 126 and the associated circuit elements form a conventional dead zone circuit having the transmission characteristic 54a shown in FIG. 1, the output of amplifier 126 being coupled through a diode 128 to the input resistor 56 of an amplifier 57. A diode 127, poled as illustrated, is also connected for transfer of current to the $-\dot{h}$ input of amplifer 57. Resistors 127, 130, and 56 form a series circuit for biasing diodes 127 and 128 and for coupling the output of the dead zone circuit 54 to terminal 131. At terminal 131, the air speed signal $V_{CAS}$ is added through resistor 55 to the output of dead zone circuit 54. The combined signals thus experience inversion in the conventional inverter amplifier 57, whereupon the summation is coupled through resistor 53 to the aforementioned input terminal 120 of circuit 61.

In the circuit 54, the negative bias voltage on terminal 128 passes through resistor 127 and, in conjunction with feed back resistor 130, biases circuit 54 to operate in its positive limiting region. A negative signal on lead 4 is required before any output can be generated by dead zone circuit 54. In a typical situation, the dead zone circuit 54 begins to produce a negative output when the $\dot{h}$ voltage on lead 4 corresponds to a craft vertical climbing speed of about 400 feet per minute. Descent of the craft holds dead zone circuit 54 in its limit.

Circuit 61, whose input terminal is terminal 120, is a summation and amplifying circuit built around a conventional operational amplifier 133; it will be observed that its associated circuit elements are generally similar to those of the previously discussed circuits 48 and 49; thus, an amplified output of circuit 61 is coupled through diode 62 as one input to the control logic circuit 66, circuit 66 being the logic resistor network 66 illustrated in FIG. 1. The operation of the FIG. 4 circuit including circuit 61 may be discussed by considering, as a first condition, that the voltages representing air speed error $V_{CAS}$ and $\dot{h}$ are all zero. For this first condition, the aforementioned nominal two volt signal applied through resistor 52 and the positive bias supplied from terminal 58a through resistor 58 both tend to drive the output at lead 150 of circuit 61 negative, which event leads to a limiting condition and hence a zero output at lead 150. The respective dead zone and amplifier circuits 54 and 57 likewise produce a zero output. Accordingly, the widths of the pulses of the pulse train output 76a of comparator 76 of FIG. 1 then depend only upon the reference voltages on leads 64 and 65 feeding the logic network 66. For representative circuit parameters, the widths are then 100 per cent, or maximum. Next, the voltage $V_{CAS}$ might logically be allowed to increase to correspond to 150 knots with air speed error and $\dot{h}$ voltages still zero. The gain of the signal $V_{CAS}$ through inverter 57 is unity, but the output signal polarity is negative. Likewise, the gain through stage 61 is also unity, but with polarity reversal. The combined effects of biases from terminal 117 through resistor 118 and from terminal 58a through resistor 58 is, for example, −5.36 volts. The input through resistor 53 is +2.67 volts, so that the net voltage is negative and is still limited. At this point the pulse widths of train 76a applied for switching the multiplier 45 are still 100 per cent.

If the voltage corresponding to $V_{CAS}$ is then increased to correspond to 200 knots, the output of inverter 57 is still −3.56 volts; this amplitude is still not sufficient to pass the limit set in circuit 61, but now the pulse width has, because of the effect of input 63 to control circuit 66, been diminished to 75.5 per cent. At a value of voltage $V_{CAS}$ corresponding to 300 knots, the output of inverter 57 is −5.34 volts; it has thus become about equal to the −5.36 volts biased output of circuit 61, so that circuit 61 is about to shift to a positive and unlimited output. The corresponding widths of the pulse of the gain controlling pulse train 76a in 23.2 per cent. As the voltage corresponding to $V_{CAS}$ is increased above the shift point, circuit 61 begins increasingly heavy conduction into input terminal 150 of the pulse width control circuit 66. The current level through input lead 150 is then equal to that through lead 63 and the two currents cancel because of the signal inversion in circuit 61. Hence, for values of $V_{CAS}$ above 300 knots for the example being discussed, no further change in the pulse width in the pulse train 76a controlling multiplier 45 is introduced.

The effect of the air speed error signal applied via lead 21 on the pulse width of train 76a may be analyzed in a similar manner. As previously noted, the output of the absolute value circuit 50 at resistor 52 can only be positive and decreases proportionally from 2 volts to zero for voltage corresponding to air speed errors of ±10 knots through zero. When the output of limiter circuit 49 is reduced to zero volts by an air speed error of 10 knots or greater, the effective unidirectional bias on circuit 61 is now −4.07 volts, for example. An air speed input voltage equal to −4.07 volts represents the voltage level at which the gain may not be further reduced (228 knots for which the pulse width of train 76a is 60.5 per cent). In other words, for air speeds greater than 228 knots, a 10 knot air speed error will increase the gain control pulse width to 60.5 per cent as a maximum value.

While the use of such signals is not necessarily a part of the present invention, there are aircraft configurations in which certain other analog signals in at least transient modes of operation of the craft may be applied at the input terminal 75a of integrator 75 of FIG. 1 for exercising special control over pulse train 76a and the operation of multiplier 45. Such signals as those generated by an engine thrust rating computer may be so employed. The signal amplitude of the output of such a thrust rating computer represents the difference between actual speed of the engine and its optimum speed value dependent upon its mode of operation. As seen in FIG. 15 of the Miller U.S. Pat. No. 3,691,356 the engine speed error is combined with an anticipatory rate term generated by passing the error circuit through a conventional rate circuit. Signals from retard bias sources may similarly be used. Such retard bias sources may include means providing a bias signal at terminal 75a to retard the throttles in conjunction with the flare phase of an automatic landing and also for supplying full retard when the craft wheels touch the landing surface, such as taught in the Miller U.S. Pat. No. 3,691,356. A present rate of retardation is initiated, for example, when the aircraft attains a present flare altitude above the landing plane as detected by a radio altimeter. A further throttle retardation at a greater rate toward throttle idle position is accomplished when the aircraft touches the landing surface as indicated, for example, by spinup of the landing gear wheels.

Figure 6:
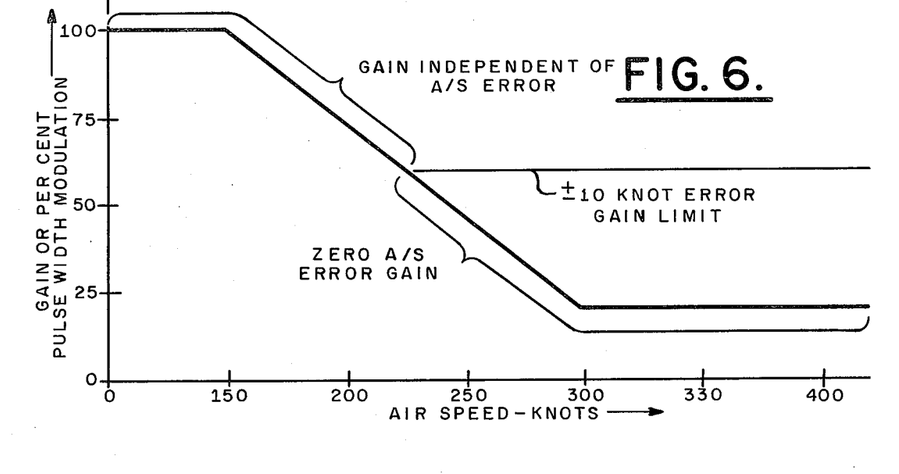
FIGS. 6 and 7 are graphs useful in discussing the general operation of the invention.

Referring to FIGS. 1 and 6, it is seen that the analog summation throttle control signals on terminal 31 derived by processing the $V_{MIN}$, $V_{SET}$, a placard limit, and $V_{CAS}$ signals are subjected to the operation of the cyclic shunt switch of gain multiplier 45 before passing to the throttle servo system. Shunt switch 29 is seen to be a device that cyclically shunts a controlled portion of the energy of the analog summation throttle control signal to ground dependent on the desired degree of pulse width modulation of wave 76a. In effect, it is therefore a gain multiplying device, multiplying the amplitude of the analog summation throttle control signals by the processed effects of air speed error and altitude rate $\dot{h}$, as further modified by other retard bias signals, if desired.

Figure 7:
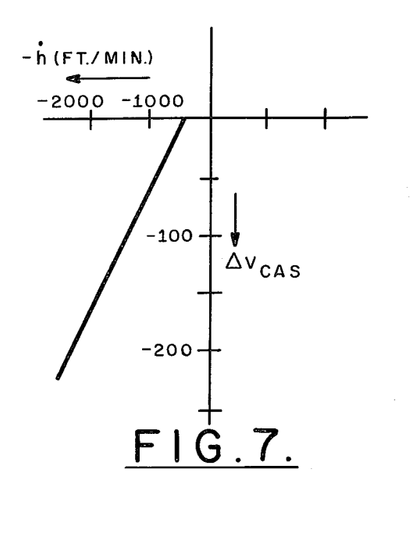

It is seen that the apparatus is useful in automatic flight during the several modes of operation including take off, climb-to cruise, cruise, let down, approach, and landing modes, the throttles being controlled by a system generally similar to that of the Miller U.S. Pat. No. 3,691,356. However, the system of the Miller patent employs a substantially fixed gain for signals injected into the throttle control servo mechanism for all flight modes and it is found that such a uniform or fixed system gain results in excessive throttle activity in high speed cruise modes, for example. According to the present invention, the gain of the system is instead controlled so as to be substantially optimum for each flight mode. Generally as illustrated in FIGS. 6 and 7, the system gain is reduced at high cruise speeds, while at lower flying speeds, the gain is increased according to a predetermined gain program. In particular, the gain program is governed by three variables; these are calibrated air speed $V_{CAS}$, air speed error, and altitude rate $\dot{h}$. The latter term is the over-riding term required for maneuvering flight. At higher cruise speeds, such as 300 knots and up in a typical transport aircraft, gain is made primarily a function of air speed error. A finite minimum gain is provided so that control is always exercised and a maximum gain is established to provide adequate but no excessive response to system error signals. By this means, if the craft is cruising at 350 knots, for example, and the human pilot selects new speed of 400 knots, the throttle system gain is automatically increased to the ±10 knot error gain limit. This might correspond, for example, to a 60 per cent pulse width modulation of the error signal supplied to the throttle servo, and the throttle servo would respond to increase the air speed, thus reducing the error. As craft speed is reduced to within the ±10 knot error gain limit, the throttle system loop gain is correspondingly reduced to a normal value. An error less than ±10 knots will produce an increasing gain. At speeds in the representative aircraft under discussion such as between 300 and 225 knots, the zero error gain is increased as a function of calibrated speed $V_{CAS}$ so that, for example, at 250 knots the pulse width floor modulation level is increased to about 50 per cent. Then, air speed errors can change the gain in terms of pulse width modulation by only about 10 per cent. Below about 225 knots, the effect of air speed error on gain is over-ridden and the gain is made a function only of $V_{CAS}$.

Referring to FIG. 7, both the air speed error gain change and the gain change with $V_{CAS}$ are automatically over-ridden when the craft is subjected to a change in pitch of magnitude which results in a change in altitude rate $\dot{h}$ greater than a predetermined value. If the craft is cruising, for example, at 350 knots and the human pilot initiates a climb maneuver resulting in a 1,000 foot per minute ascent rate, then maximum automatic throttle servo loop gain is provided. In this manner, the throttle is quickly advanced by the throttle servo because of the increase in craft vertical speed. Such is accomplished, according to the invention, by feeding the signal proportional to altitude rate $\dot{h}$ into the gain programming system, thus over-riding the effects of gains due to craft air speed and $V_{CAS}$ and consequently forcing the loop gain up to its 100 per cent value. Accordingly, it is seen that the invention provides reliable and desirable control over all modes of flight, providing a suitable servo loop gain for the throttle control system, the gain in use being optimum for the selected flight mode.

While the invention has been described in its preferred embodiment, it is to be understood that the words which have been used are words of description rather than of limitation and changes within the purview of the appended claims may be made without departure from the true scope and spirit of the invention in its broader aspects.

I claim:

1. In a variable gain engine throttle control system for an airborne craft:
    craft command speed signal generator means,
    craft air speed signal generator means,
    differential means responsive to said craft command speed signal generator means and to said craft air speed generator means for developing an error signal,
    gain control signal generator means responsive to said error signal and to said craft air speed signal for providing an output summation signal of signals representative of said error signal and said craft air speed signal,
    gain multiplier means in series relation with said differential means and responsive to said gain control signal generator means, and
    engine throttle control means responsive to said gain multiplier means.

2. Apparatus as described in claim 1 additionally including means contributing to said error signal comprising rate generator means responsive to said craft air speed generator means.

3. Apparatus as described in claim 2 additionally including means contributing to said error signal comprising:
    combining means for combining said error signal with a signal representative of craft acceleration along the craft flight path, and
    filter means responsive to said combining means.

4. In a variable gain engine throttle control system for an airborne craft:
    craft command speed signal generator means,
    craft air speed signal generator means,
    differential means responsive to said craft command speed signal generator means and to said craft air speed signal generator means for developing an air speed error signal,
    rate generator means responsive to said craft air speed generator means,
    first combining means for combining said craft air speed error signal with a signal representative of craft acceleration along the craft flight path,
    filter means responsive to said first combining means,
    second combining means for combining said air speed error signal and the outputs of said filter means and said rate generator means,
    gain control signal generator means responsive to said air speed error signal and to said craft air speed signal,
    said gain control signal generator means including means for converting said air speed error signal into a unipolar signal, gain multiplier means responsive to said second combining means and to said gain control signal generator means, and engine throttle control means responsive to said gain multiplier means.

5. Apparatus as described in claim 4 wherein said gain control signal generator means includes in series relation:

first limiter means responsive to said error signal, and second limiter means responsive to said first limiter means and to said error signal.

6. Apparatus as described in claim 4 wherein said gain control signal generator means is additionally responsive to craft altitude rate generator means.

7. Apparatus as described in claim 4 wherein said gain control signal generator means is responsive to a summation signal comprising said true air speed generator means output and a limited version of craft altitude rate.

8. Apparatus as described in claim 7 wherein said gain control signal generator means is responsive to said unipolar signal and to said summation signal for providing an analog output gain control signal.

9. Apparatus as described in claim 8 including analog-to-variable pulse-width pulse output signal converter means for converting said analog output gain control signal into variable width pulses for controlling the effective gain of said gain multiplier means.

10. Apparatus as described in claim 9 wherein said gain multiplier means includes switch means for cyclically connecting said differential means to and from ground potential in synchronism with said variable pulse width pulse output signals.

* * * * *